United States Patent [19]

Acres et al.

[11] 3,806,582

[45] Apr. 23, 1974

[54] CATALYTIC REACTIONS

[75] Inventors: Gary James Keith Acres; Robert Michael Hutchings, both of London, England

[73] Assignee: Matthey Johnson & Co., Limited, London, England

[22] Filed: Sept. 11, 1970

[21] Appl. No.: 71,329

[52] U.S. Cl.............. 423/239, 252/460, 252/466 PT
[51] Int. Cl............................................. B01d 53/34
[58] Field of Search.............. 23/2 S, 2 E, 157, 159, 23/161; 423/217–219, 235, 239, 212–214

[56] References Cited
UNITED STATES PATENTS

| | | | |
|---|---|---|---|
| 3,467,492 | 9/1969 | Newman | 23/2 S |
| 3,118,727 | 1/1964 | Cohn | 23/2 S |
| 3,161,605 | 12/1964 | Beck et al. | 23/2 S |
| 3,565,830 | 2/1971 | Keith et al. | 23/2 E |
| 3,056,646 | 10/1962 | Cohn et al. | 23/2 S |
| 3,245,920 | 4/1966 | Keith et al. | 23/2 S X |
| 3,255,027 | 6/1966 | Talsma | 252/463 X |
| 3,425,803 | 2/1969 | Romeo, Sr. | 23/2 S X |

FOREIGN PATENTS OR APPLICATIONS 883,946   12/1961   Great Britain........................ 23/2 S

*Primary Examiner*—Earl C. Thomas
*Attorney, Agent, or Firm*—Cushman, Darby & Cushman

[57] ABSTRACT

In this specification there is described a process for the purification of gases containing noxious constituents and especially the catalytic purification of gases containing noxious oxides of nitrogen. A gas containing the noxious oxides and including oxygen and a gaseous reducing fuel, is passed at a temperature above the ignition temperature of the gas and the fuel through a catalyst comprising an inert material impregnated or coated with a mixture or alloy of platinum and rhodium metals and rhodium is present in an amount of between 20 and 50 weight percent of the total metal content of the catalyst. The invention also includes catalysts for carrying out the above process.

5 Claims, No Drawings

CATALYTIC REACTIONS

This invention relates to the purification of gases containing noxious constituents and more especially to a process for the catalytic purification of gases containing noxious oxides of nitrogen. Additionally the invention relates to a catalyst for use in effecting the catalytic purification of such gases.

Production of nitric acid by the oxidation of ammonia normally results in a tail or waste gas containing noxious NO and $NO_2$. These oxides of nitrogen are present in the tail gases due to the incomplete conversion of the nitrogen oxides to nitric acid and, as a result, the noxious oxides of nitrogen have been discharged to the atmosphere heretofore with the tail gases. The discharge of these oxides of nitrogen to the atmosphere is undesirable since they are corrosive and present risk of injury to vegetable and animal life.

The tail gas from nitric acid plants wherein ammonia is oxidized typically contains, by volume, from 0.1 to 0.5 per cent of NO, trace to 0.3 per cent of $NO_2$, from 2 to 5 per cent of $O_2$ and the balance inert constituents, e.g., nitrogen and argon. Additionally $N_2O$ may also be present in amount of from a trace to 1 per cent by volume. The gas may also contain water vapour in amount up to 5 per cent by volume.

For air pollution abatement (known as "NOX" abatement), it is desirable to remove all or virtually all of the nitrogen oxides before venting the tail gas to the atmosphere. However, commercially, both incomplete and complete removal of the nitrogen oxides are of interest. We have found that catalytic reduction of the nitrogen oxides may be successfully used for the purification of the tail gas. In such a process a reducing fuel, e.g., $H_2$, CO, a normally gaseous hydrocarbon, namely methane, or natural gas, or other hydrocarbon gases or liquids, is injected into the tail gas and reacted with the nitrogen oxides in the stream. When the fuel exceeds the nitrogen oxides and oxygen stoichiometrically, the nitrogen oxides are reduced to exceedingly low concentrations. Because of the large gas flows involved in the manufacture of nitric acid, typically about 1 million standard cubic feet of gas per hour, in a plant having a nitric acid production of 240 tons per day, it is required that the catalysts utilised to effect the purification have a high level of activity and that the reactors be capable of handling large gas flows.

Many nitric acid plants use high pressure processes in the ammonia oxidation step, and it is highly advantageous to recover from the plant tail gas, energy which can be utilised to supply the power requirements of the system. In a suitable system, enough energy can be recovered for the process to be self-sustaining and even to provide additional power. In such systems, it is important the catalyst be highly active, exhibit a minimum resistance to gas flow, and catalyze the reaction at low initial reaction temperatures, or ignition temperatures.

According to one aspect of the present invention there is provided a process for the removal of an oxide of nitrogen from a gas containing at least an oxide of nitrogen and oxygen, the process comprising passing the gas together with a gaseous reducing fuel, at a temperature above the ignition temperature of the gas and fuel, through a supported catalyst comprising an inert material impregnated or coated with a mixture or alloy of platinum and rhodium metals in which rhodium comprises from 20 to 50 weight percent of the total metal content. Conveniently the gas to be processed is in the form of a stream.

According to a further feature of this invention, therefore, a catalyst for use in NOX abatement comprises an inert material impregnated or coated with a mixture or alloy of platinum and rhodium metals in which rhodium comprises from 20 to 50 weight percent of the total metal content.

Preferably, the inert material has a first deposit of a refractory metal oxide which is itself then impregnated or coated with a mixture or alloy of platinum and rhodium metals as specified above.

Preferably the gaseous reducing fuel contains methane as a major component and preferably rhodium comprises from 30 to 40 weight percent and even more preferably, about 35 weight percent of the total metal in the mixture or alloy.

Although the nitrogen oxides are successfully removed at the space velocities which are necessarily involved in the manufacture of nitric acid, considerable back pressure due to packing together of the particulate catalyst within the reactor are a problem. In an effort to eliminate these back pressures occurring with such particulate catalysts, reactors of large volume have been tried but the large volume reactors are relatively very expensive. Further, the catalyst particles move about and rub against each other due to the high velocity gas flow with the result there is loss of appreciable amounts of expensive platinum group metal by attrition, and further there tends to be an increase of the undesirable back pressure due to dusting.

A number of attempts have been made to solve these problems. In the use of a supported catalytic metal for NOX abatement the most difficult fuel to use is methane as it requires high catalyst temperatures before the reaction occurs. Methane is, however, one of the cheapest fuels available and if a catalyst could be made which was active for methane at substantially lower reaction temperatures it would constitute a substantial advance over the existing processes. The catalyst itself must, however, still have reasonably high (750°–800° C) temperature stability. Equivalent problems are associated with the use of natural gas (which is mostly methane with some $H_2$).

Important advantages of low ignition temperature include:

a. better fuel conversion efficiency and lower running costs;
b. a higher percentage removal of noxious gases escaping into the atmosphere;
c. smaller heat exchangers and a cheaper reactor system may be used, and
d. it makes possible the use of a single catalyst bed instead of a duel system with tail gases containing less than 3.5 percent $O_2$. In most modern plants for the production of nitric acid this is generally the case.

At present commercial NOX systems using natural gas as fuel are not very satisfactory when compared with those systems using more expensive fuels such as $H_2$ or naphtha. Because of the high catalyst inlet temperature a two bed catalyst system is always necessary and in many cases poor fuel conversion efficiency, poor NOX abatement and a very short catalyst life are reported.

It is an object of this invention to provide a catalyst enabling ignition to take place at a low temperature, thus enabling a low temperature of the inlet gas stream to be achieved.

According to another aspect of the present invention, a process for the removal of an oxide of nitrogen from a gas containing an oxide of nitrogen, oxygen, and an inert gaseous constituent, comprises passing the gas together with a gaseous reducing fuel at a temperature above the ignition temperature of the gas and fuel, through a supported catalyst comprising an inert rigid porous refractory honeycomb structure, impregnated or coated with a mixture or alloy of platinum and rhodium metals in which rhodium comprises 20 to 50 weight percent of the total metal content.

Preferably the refractory honeycomb structure also has deposited thereon a first coating of a refractory metal oxide and said coating is then further impregnated or coated with said mixture or alloy of platinum and rhodium metals.

Preferably also, the gaseous reducing fuel contains methane as a major component and preferably rhodium comprises from 30 to 40 weight percent and, even more preferably, about 35 weight percent of the total metal in the mixture or alloy.

The inert rigid porous refractory honeycomb structure may be of a ceramic material. Suitable ceramic materials are zircon-mullite, mullite, alpha alumina, sillimanite, magnesium silicates, zircon, petalite, spodumene, cordierite, and aluminosilicates. A suitable proprietary product is "Torvex" (Registered Trade Mark) sold by E. I. Du Pont de Nemours & Co. Either so-called "straight through" or "crossflow" "Torvex" may be used. "Torvex" is a mullite ceramic honeycomb structure (see Talsma U.S. Pat. No. 3,255,027).

The following characteristics have been found to be suitable in the working of the invention, but are not, of course, obligatory for successful operation of the process.

The inert structure, used in the presence of the present invention and on to which the refractory metal oxide is deposited, is an inert unitary rigid honeycomb structure or block having a plurality of openings or channels therethrough in the direction of gas flow. The structure will usually occupy nearly all of the cross-sectional area of the reaction zone available with a packing between the structure and the reactor walls so as to prevent by-passing of the structure by any part of the gas stream. For large cross-sectional areas, say 6 inches or more, it is convenient to have a regularly arranged array of closely fitting blocks of the honeycomb material. It may also be desirable for more complete purification to provide sequential or serial block positioning, and in this latter case the low back pressure may be further reduced between layers of blocks if desired by shallow parallel grooves at an end of a block to enlarge connections between channels. Advantageously, the unitary structure is shaped to fit, and preferably, closely fit, the reaction zone or reactor into which it is to be disposed. Blocks of appropriately shaped honeycomb material to support the catalyst are placed in the reactor so that the general direction of the cellular gas flow channels is in line with the gas flow through the reactor. Alternatively, the blocks may be disposed so that the gas flow is radial or transverse to the general or overall gas flow.

The structure support is constructed of a substantially chemically inert, rigid, solid porous refractory material capable of maintaining its shape and strength at high temperatures, for instance up to 1,100° C. or more. The refractory material should preferably have a bulk density of from 0.45 to 1.05 grams per cubic centimeter, (from 0.5 to 0.9 grams per cubic centimeter is more suitable) and be unglazed. The accessible pore volume not including the volume of gas flow channels is preferably greater than 0.10 cubic centimeter per gram of structure, more preferably between 0.20 and 0.30 cc/g.

The walls of the channels of the unitary support structures of this invention contain macropores in communication with the channels to provide increased accessible catalyst surface, and an absence of large numbers of small pores for high temperature stability and strength. Whereas the superficial surface area of such structures may be from 0.001 to 01 $m^2/g$ including the channels, the total surface area is typically hundreds of times greater, so that much of the catalytic reaction will take place in the large pores. The structure preferably has a macropore distribution such that over 95 percent of the pore volume is in pores having a size, i.e., a diameter, greater than 2,000 Angstrom units, and over 5 percent of the pore volume preferably is in pores having a size of over 20,000 A. In a preferred embodiment over 50 percent of the pore volume is in pores of sizes of over 20,000 A.

The superficial surface area of the carrier including the walls of the gas flow channels should be as large as is consistent with an acceptable back pressure in the gas flow system. The superficial surface area will often be from 0.5 to 6, preferably from 1 to 2.5, square meters per liter of support. Thus, the channels through the unitary structure can be of any shape and size consistent with the desired superficial surface and should be large enough to permit free passage of the nitrogen oxide-containing gas to be purified and to prevent plugging by any solid matter entrained by the gas. In one embodiment, the channels are generally parallel and extend through the support from one side to an opposite side and, such openings are separated from one another by preferably, thin walls defining the openings. In another embodiment, a network of channels permeates the body. The channels are unobstructed or substantially unobstructed to the gas flow. For most efficient operation, the channel inlet openings are distributed across essentially the entire face or cross-section of the support subject to initial contact with the gas to be reacted. The preferred structure supports of this invention are of mullite characterized by having good thermal shock resistance because of its low coefficient of thermal expansion, although other similar chemically inert refractory crystalline ceramic materials can also be employed. Examples of other refractory materials suitable as a support or carrier are, for instance, alpha-alumina, sillimanite, magnesium silicates, zircon, petalite, spodumene, cordierite, alumino-silicates, etc.

Unlike a pellet catalyst bed which must be vertical with downward gas flow, there is no restriction on either the position of a ceramic honeycomb catalyst or the direction of the gas flow through a reactor containing it. Ceramic honeycombs have a high surface-to-volume ratio and therefore when supporting catalytic metals produce catalysts which are more active than pelleted catalysts. Because of their open structure the pressure drop across a ceramic honeycomb catalyst bed is only 1/20 of that across a pellet bed of similar dimensions. Honeycomb supports also have high thermal shock resistance and structural strength and have the great advantage of being attrition resistant.

The refractory metal oxide is deposited on the support (either continuously or discontinuously) and preferably the deposit is in the form of a film of from 0.0004 to 0.001 inches thick.

Such an oxide is a calcined refractory metal oxide which itself is characterized by a porous structure and which possesses a large internal pore volume and total surface area and is therefore referred to as an "active" (i.e., catalytically active) refractory metal oxide.

The preferred active refractory metal oxides contain members of the gamma or activated alumina family, which can be prepared, for instance, by precipitating a hydrous alumina gel and, thereafter, drying and calcining to expel hydrated water and provide the active gamma-alumina. A particularly preferred active refractory metal oxide is obtained by drying and calcining at temperatures of 300° to 800° C a precursor mixture of hydrous alumina phases predominating in crystalline trihydrate, that is, containing in excess of 50 percent by weight of the total alumina hydrate composition, preferably from 65 percent to 95 percent of one or more of the trihydrate forms gibbsite, bayerite and norstrandite by X-ray diffraction.

Other suitable active refractory metal oxides include for example, active or calcined beryllia, zirconia, magnesia or silica, and combination of metal oxides such as boria-alumina, or silica-alumina. Preferably the active refractory oxide is composed predominantly of oxides of one or more metals of Groups II, III and IV of the Periodic Table having atomic members not exceeding 40. The active refractory metal oxide deposit may constitute from 1 to 50 weight per cent of the unitary support, preferably from 5 to 30 weight per cent.

The active refractory metal oxide of the present invention may be deposited on the support in several ways. One method involves dipping the support into a solution of the salt of the refractory metal and calcining to decompose the salt to the oxide form. Another and preferred method comprises dipping the support into an aqueous suspension, dispersion or slurry of the refractory oxide itself, drying and calcining. In this method, suspensions or dispersions having a solids content of from 10 to 70 percent by weight can be used to deposit a suitable amount of a refractory metal oxide on the support in a single application. In order to prepare a catalyst having 10 percent by weight of activated alumina on a zircon-mullite structure, from 20 to 40 percent by weight of solids is used in the suspension. The percentage of the solids present is determined on an ignited weight basis (ignited at 1,100° C.). A particularly preferred method involves forming an aqueous dispersion or slurry as just described and subjecting the mixture to a wet grinding or milling operation whereby the refractory metal oxide is reduced to a finely divided form and a thixotropic slip obtained, having the desired consistency, e.g., a solids content of 10 to 70 percent by weight. The support is then dipped into the slip, dried and calcined. In general, calcining temperatures of from 150° to 800° C. are employed. The calcination is favourably conducted in air, for example, flowing dried air, or may be carried out in contact with other gases such as oxygen, nitrogen, or flue gas, or under vacuum conditions. The refractory oxide is deposited on the surfaces of the structure including the channel surfaces and superficial macropores in communication with the channel surfaces as thin deposits in a weight ratio of from 1 to 50 percent and preferably from 5 to 30 percent relative to the weight of the block.

The structure support may be wetted prior to applying the refractory metal oxide. In one embodiment, a zircon-mullite structure is immersed in an aqueous suspension containing the desired weight concentration of hydrated refractory oxide. The structure, because of its porosity, has been found to absorb the suspension readily. The catalyst structure is then dried and calcined at a temperature of from 400° to 800° C. and preferably of from 450° to 550° C. A ⅛ cubic foot zircon-mullite block absorbs roughly from 0.25 to 1 liter of the suspension.

The supported catalyst made in accordance with the method of this invention has a refractory oxide deposited on the inert ceramic structure and a catalytically active metal impregnated on the refractory oxide.

Impregnation with the mixture or alloy of platinum and rhodium may be accomplished by known methods of deposition of catalytically active metals of supports.

For example, the ceramic honeycomb structure, with activated alumina deposited thereon, may be immersed in a solution of a water-soluble inorganic salt or salts of the platinum and rhodium such as chloroplatinic acid and rhodium trichloride, agitating the mixture to ensure uniform distribution, and precipitating the metals by chemical or thermal reduction or by precipitating them in a chemically combined state on the catalyst structure. The metal is activated by conventional techniques.

After impregnation with platinum and rhodium, the catalyst may advantageously be contacted with hydrogen sulfide to fix the Pt-Rh alloy or mixture in the active refractory oxide film as a sulfide and give a more active and suitable catalyst with good dispersion of the Pt-Rh metals in a form preventing migration of the metal during drying and calcination. Alternatively, an aqueous solution of platinum and rhodium compounds may be reacted with hydrogen sulfide to form a sol, and this sol is applied to the film of active refractory metal oxide. Following these treatments the completed catalyst can be calcined, within the range of 150° to 800° C. and under conditions as previously disclosed.

It is desirable the final catalyst has the refractory metal oxide film in the activated or calcined state. Activation of the refractory metal oxide film may be carried out prior to depositing it on the support or subsequent thereto and even after the Pt and Rh impregnation step. Usually, such material is calcined or partially calcined before placement on the carrier and also after such placement and before deposition of the platinum group metal component. The catalyst containing the Pt-Rh metal mixture may be reduced as by contact with molecular hydrogen at elevated temperatures before, during or after calcination.

The amount of platinum and rhodium necessary will vary depending on the particular ratio selected. In all instances, however, the amount of platinum and rhodium compound added will be that sufficient to provide a small but catalytically effective amount of the metal in the final catalyst to catalyze the removal of the nitrogen oxides from the gas. In general, the total amount of platinum and rhodium may be in the range of, by weight, from 0.05 to 10 per cent preferably 0.5 to 2.0 per cent (based on total supported catalyst).

Suitable concentrations, which we have found to be satisfactory, are 0.9 percent w/w and 1.8 percent w/w.

EXAMPLE 1

Using 1.5 percent methane or natural gas injected as fuel into a nitric acid manufacture tail gas containing typical quantities of NO, $NO_2$, $N_2O$, 3% $O_2$ and balance inert constituents such as $N_2$ and Ar at atmospheric pressure and a space velocity of 100,000 $hr^{-1}$, the following ignition temperatures were achieved for the catalysts shown:

|  | Ignition temperature |
|---|---|
| Pd/ceramic honeycomb | 275–300°C |
| Pt/Torvex | 425–450°C |
| 35% Rh 65% Pt on Torvex | 300–325°C |

The total metal concentration of the 35% Rh 65% Pt catalyst was 120g per cu ft. of catalyst (or approximately 0.9 percent w/w).

Pt/Rh catalysts according to the present invention when used in NOX abatement may be expected to have an active life of at least 2½ years. While the Pd on ceramic honeycomb catalyst exhibits acceptable ignition temperatures, it has been found to be unstable at these temperatures of operation and has been known to fail in one month.

The results thus indicate that 35% Rh 65% Pt catalysts according to the present invention combine a usefully low ignition temperature with good stability under oxidising conditions at elevated temperatures.

EXAMPLE TWO

Using the same conditions as described in Example One the ignition temperature was determined for a range of Rh-Pt ratios from 0 Rh–100 Pt to 100 Rh – 0 Pt.

Results were as follows:

| Rh-Pt ratio | Ignition temperature |
|---|---|
| 0 : 100 | 425 |
| 5 : 95 | 410 |
| 20 : 80 | 330 |
| 35 : 65 | 315 |
| 50 : 50 | 325 |
| 100 : 0 | 400 |

The results clearly indicate that the lowest ignition temperature range, and therefore greatest efficiency in NOX abatement is for Rh-Pt ratios from 20–80 to 50–50 with the optimum appearing at from 30–70 to 40–60 and with a peak value at approximately 35 weight percent Rh-Pt.

EXAMPLE THREE

Using 1.78 percent by volume methane or natural gas injected into a nitric acid plant tail gas at 75 lbs per square inch (psi) pressure which also contained 3 percent by volume oxygen and 2,000 ppm oxides of nitrogen, the following results were obtained with 35% Rh 65% Pt on mullite ("TORVEX"):

| | |
|---|---|
| Inlet temperature to catalyst | 420°C |
| Ignition temperature | 325°C |
| Methane conversion efficiency | Greater than 90% |
| Output of unconverted oxides of nitrogen | 80 ppm |
| Percentage conversion of oxides of nitrogen | 96% |

Using a Pd/TORVEX catalyst the output of oxides of nitrogen under identical conditions was 400 ppm, five times as much as with a catalyst according to the present invention.

What we claim is:

1. A process for the removal of noxious oxides of nitrogen from waste gases containing the same in admixture with oxygen, the process comprising injecting into the waste gas a quantity of gaseous reducing fuel sufficient to provide a slight stoichiometric excess over the total content of nitrogen oxides and oxygen present and passing the resulting gaseous mixture at a temperature above the ignition temperature of the waste gas and fuel at a pressure from about atmospheric up to 75 pounds per square inch, through a supported catalyst whereby the content of nitrogen oxide is effectively reduced, the ignition temperature of the waste gas and the fuel in the presence of the said supported catalyst being in the range of 300° to 325° C and the same supported catalyst consisting essentially of a ceramic material in the form of a rigid porous refractory honeycomb structure having deposited upon its surface a first layer of a high surface area refractory metal oxide selected from the group consisting of calcined or active alumina, beryllia, zirconia, magnesia and silica and further having a second layer deposited upon the first layer consisting essentially of an alloy of 65 percent by weight platinum and 35 percent by weight rhodium.

2. A process according to claim 1 in which the gaseous reducing fuel has methane as a major component.

3. A process according to claim 2 in which the gaseous reducing fuel is natural gas.

4. A process according to claim 1 in which the ceramic is a material selected from the group consisting of zircon-mullite, mullite, alpha alumina, sillimanite, magnesium silicates, zircon, petalite, spodumene, cordierite and the alumino silicates.

5. A process according to claim 1 in which the waste gas is that produced in a stage of the manufacture of nitric acid.

* * * * *

PO-1050
(5/69)

UNITED STATES PATENT OFFICE
CERTIFICATE OF CORRECTION

Patent No. 3,806,582      Dated April 23, 1974

Inventor(s) Gary James Keith Acres and Robert Michael Hutchings

It is certified that error appears in the above-identified patent and that said Letters Patent are hereby corrected as shown below:

In the heading of the patent:

The assignee should be changed to read --Johnson, Matthey & Co., Limited--

Add:

--[30] Foreign Application Priority Data

September 16, 1969    Great Britain.... 45545/69--

Signed and sealed this 3rd day of December 1974.

(SEAL)
Attest:

McCOY M. GIBSON JR.          C. MARSHALL DANN
Attesting Officer            Commissioner of Patents